United States Patent [19]

Kagami et al.

[11] 4,085,350
[45] Apr. 18, 1978

[54] GASEOUS DISCHARGE LIGHT EMITTING ELEMENT

[75] Inventors: Akiyasu Kagami, Ninomiya-machi; Takashi Hase, Fujisawa; Minoru Hiraki, Chigasaki; Junro Koike, Tokyo; Ryuya Toyonaga, Tokyo; Takehiro Kojima, Tokyo, all of Japan

[73] Assignee: Nippon Hoso Kyokai, Tokyo, Japan

[21] Appl. No.: 737,026

[22] Filed: Oct. 29, 1976

[30] Foreign Application Priority Data

Oct. 31, 1975   Japan ................... 75-131007

[51] Int. Cl.$^2$ .............................. H01J 61/44
[52] U.S. Cl. ..................... 313/486; 252/301.4 R
[58] Field of Search ................ 313/486, 487; 252/301.4 R

[56] References Cited

U.S. PATENT DOCUMENTS

| 3,250,722 | 5/1966 | Borchardt | 252/301.4 R |
| 3,417,027 | 12/1968 | Wanmaker et al. | 252/301.4 R |
| 3,458,450 | 7/1969 | Kobayashi et al. | 252/301.4 R |
| 4,000,436 | 12/1976 | Toryu et al. | 313/487 |

Primary Examiner—Palmer C. Demeo
Attorney, Agent, or Firm—Fleit & Jacobson

[57] ABSTRACT

In an air-tight container made of transparent material, a phosphor, a gas or gas mixture and a pair of discharging electrodes are contained. The discharge gap is in the range of 0.1 to 3.0mm, and the pressure of the gas or gas mixture sealed in the container is such that the product of the pressure and the discharge gap is in the range of 30 to 300 Torr.mm. The gas or gas mixture has discharge radiation spectra within the region of wavelength shorter than 200nm. The phosphor is a europium activated yttrium gadolinium borate phosphor represented by the formula $$\{[(Y_{1-x},Gd_x)_{1-z}B_z]_{1-y}Eu_y\}_2O_3$$

where $x$, $y$ and $z$ are defined by the ranges of $0 \leq x \leq 1$, $0.001 \leq y \leq 0.1$ and $0.25 \leq z \leq 0.75$. More preferably, $x$, $y$ and $z$ are defined by the ranges of $0.10 \leq x \leq 0.60$, $0.005 \leq y \leq 0.05$ and $0.50 \leq z \leq 0.65$.

8 Claims, 8 Drawing Figures

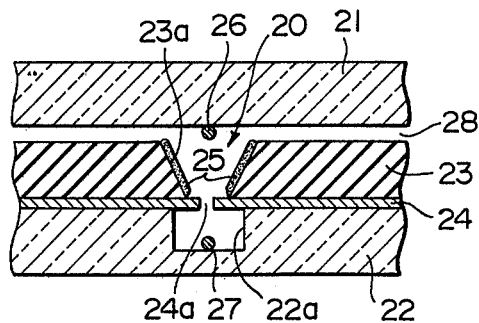
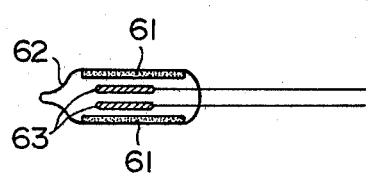
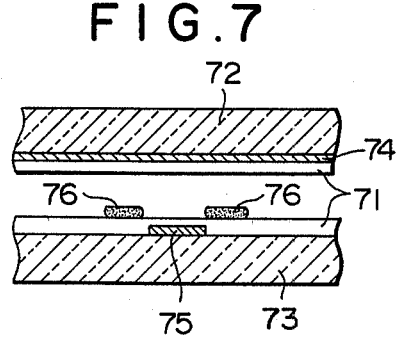
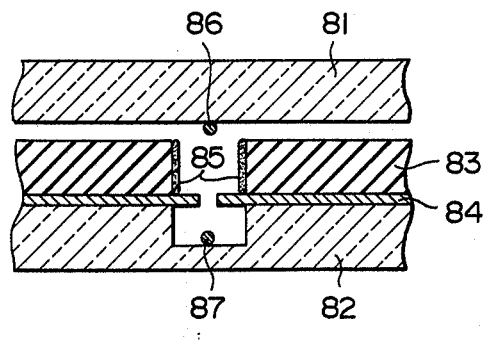

GASEOUS DISCHARGE LIGHT EMITTING ELEMENT

BACKGROUND OF THE INVENTION

1. Field of the Invention

This invention relates to a gaseous discharge light emitting element, and more particularly to a light emitting element which, being of the type employing a red emission phosphor excited by ultraviolet rays irradiated by gaseous discharge, comprises an air-tight transparent container, a gas, a phosphor and a pair of discharge electrodes sealed therein and is appropriate for use as a small lamp or use in an image display panel.

This invention is particularly concerned with a novel combination of a gas and a phosphor sealed in the air-tight container of the light emitting element which combination effects a high radiation efficiency. In the light emitting element, the discharge gap is in the range of 0.1 to 3.0mm and the pressure of the gas sealed in the container is such that the product of the pressure and the discharge gap (hereinafter referred to as "pd product") is in the range of 30 to 300 Torr.mm.

2. Description of the Prior Art

It has been known in the art to excite a phosphor with ultraviolet rays emitted by gaseous discharge to cause the phosphor to emit light. For instance, fluorescent lamps employ a phosphor which is excited by ultraviolet rays having a wavelength of 253.7nm emitted by a gaseous discharge in a mercury vapor. When the vacuum gap between a pair of discharge electrodes within a small lamp is smaller than 3mm, the pressure of the gas sealed in the lamp is required to be as high as several ten to several hundred Torr in accordance with Paschen's law. In small lamps or image display panels in which the gap between the electrodes is smaller than 3mm, therefore, the radiation of ultraviolet rays cannot be obtained effectively since the vapor pressure of mercury sealed within the lamp together with other gases such as argon is very low. In order to effectively produce ultraviolet rays by a gaseous discharge, it is necessary to heat the discharge lamp or the image display panel with a heater or the like so as to increase the vapor pressure of mercury therein. However, this requires consumption of electric power for heating and necessitates use of a large sized heating panel when the image display panel has a large size, and accordingly it is impractical to heat the discharge lamp or the like. Further, from the point of environmental pollution it is undesirable to use a large amount of mercury. Therefore, in general, this kind of discharge lamp and other similar devices usually employ a rare gas, a hydrogen gas or a nitrogen gas or an appropriate mixture of these gases because with such gases a pressure of several ten to several hundred Torr can easily be obtained at room temperatures. The ultraviolet rays emitted by the gaseous discharge in the above mentioned gas or gas mixture have radiation spectra of high intensity mostly within the so-called vacuum ultraviolet region corresponding to the wavelength of shorter than 200nm.

The radiation efficiency is defined as the ratio of the emission intensity (watt) to the excitation intensity (watt). As conventional phosphors which are used in image display panels employing gaseous discharge with a discharge gap of 0.1 to 3.0mm and pd product of 30 to 300 Torr.mm and emitting red light under excitation by ultraviolet rays having a wavelength of shorter than 200nm, there have been known a europium activated yttrium oxide phosphor ($Y_2O_3$:Eu) and a europium activated yttrium vanadate ($YVO_4$:Eu). These phosphors, however, suffer from the defect that the radiation efficiency is rapidly decreased in the region where the wavelength of the exciting radiation falls below 200nm. When in the form of powder, the first mentioned phosphor, $Y_2O_3$:Eu, has a considerably higher radiation efficiency than the latter mentioned phosphor, $YVO_4$:Eu. However, when its form is changed to be applied to the tube or the wall of a light emitting element, the radiation efficiency thereof is markedly reduced.

Accordingly, neither the brightness nor the radiation efficiency of a light emitting element which employs one of the above-described phosphors is satisfactorily high due to the low radiation efficiency of the red emission phosphor. More specifically, in an image display panel which uses red, green and blue light emitting elements to display a multi-color image based on the additive color process, the brightness of the white color and the radiation efficiency are controlled at a low level because of the low brightness and radiation efficiency of the red light emitting element. In order to increase the brightness of the white color, therefore, the discharge current, the duration of light emission and the number of elements of red light emitting elements must be increased.

SUMMARY OF THE INVENTION

In view of the above described defects inherent in the conventional light emitting elements, the primary object of the present invention is to provide a gaseous discharge light emitting element which has a high radiation efficiency.

Another object of the present invention is to provide a gaseous discharge light emitting element which provides red light emission of high brightness.

Another object of the present invention is to provide a gaseous discharge light emitting element which makes it possible to produce a color image display panel having a high brightness of white color and a high radiation efficiency.

The above objects are accomplished by employing as the phosphor a europium activated yttrium gadolinium borate phosphor represented by the formula,

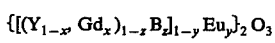

where $0 \leq x \leq 1$, $0.001 \leq y \leq 0.1$, $0.25 \leq z \leq 0.75$, and as the gas a gas which has its discharge radiation spectra in the region of the wavelength shorter than 200nm. The gaseous discharge light emitting element of this invention employing the combination of the above phosphor and the gas has a discharge gap of 0.1 to 3.0mm and a pd product of 30 to 300 Torr.mm. The above defined phosphor becomes a europium activated yttrium borate phosphor when $x=0$ and a europium activated gadolinium borate phosphor when $x=1$, both being referred to as a europium activated yttrium gadolinium borate phosphor in this specification. The above defined phosphor has high radiation efficiency within the wavelength region of from 125 to 180nm in comparison with the conventional phosphors such as europium activated yttrium oxide and europium activated yttrium vanadate. Therefore, the gaseous discharge light emitting element employing the above defined phosphor has high radiation efficiency. Further, the radiation efficiency of the europium activated yttrium gadolinium borate phosphor is not lowered through a process of applying the same to a wall of a gaseous discharge light emitting element. Thus, the brightness and the radiation efficiency of an image display panel employing the light emitting element in accordance with the present invention are markedly enhanced in comparison with the conventional image display panels.

It should be noted that it has been known in the art to use europium activated yttrium gadolinium borate phosphor as a phosphor excited under cathode ray excitation, but it has not been known that the radiation efficiency thereof is high under vacuum ultraviolet ray excitation.

BRIEF DESCRIPTION OF THE DRAWING

FIG. 2 is a fragmentary sectional view showing a gaseous discharge cell employed in an embodiment of a light emitting element in accordance with the present invention, FIG. 6 is a longitudinal sectional view of a small lamp of diode type which can be used as a light emitting element in the present invention, and FIGS. 7 and 8 are fragmentary sectional views each showing an example of a gaseous discharge image display panel which can be used as a light emitting element in the present invention.

DESCRIPTION OF THE PREFERRED EMBODIMENTS

Now the present invention will be described in detail with reference to preferred embodiments thereof. Prior to a detailed description of the preferred embodiments, there will be given as background a general explanation of the phenomenon of gaseous discharge.

As is well known in the art, ultraviolet rays are emitted by glow discharge in various kinds of gases. Among the wavelengths of the ultraviolet rays obtained by glow discharge, those which have particularly high radiation intensity are shown in Table I below, together with the kind of gases in which the radiations are obtained.

TABLE I

| Gas | Wavelength of high intensity radiation (nm) | | |
|---|---|---|---|
| Hydrogen | 121.6 | 161.6 | many line spectra around 160 |
| Helium | 58.4 | 59.2 | continuous spectra 58–110 |
| Nitrogen | | | many line spectra 100–150 |
| Neon | 73.6 | 74.3 | continuous spectra 74–100 |
| Argon | 104.8 | 106.7 | continuous spectra 105–155 |
| Krypton | 116.5 | 123.6 | continuous spectra 125–180 |
| Xenon | 129.6 | 147.0 | continuous spectra 148–200 |

Figure 1:
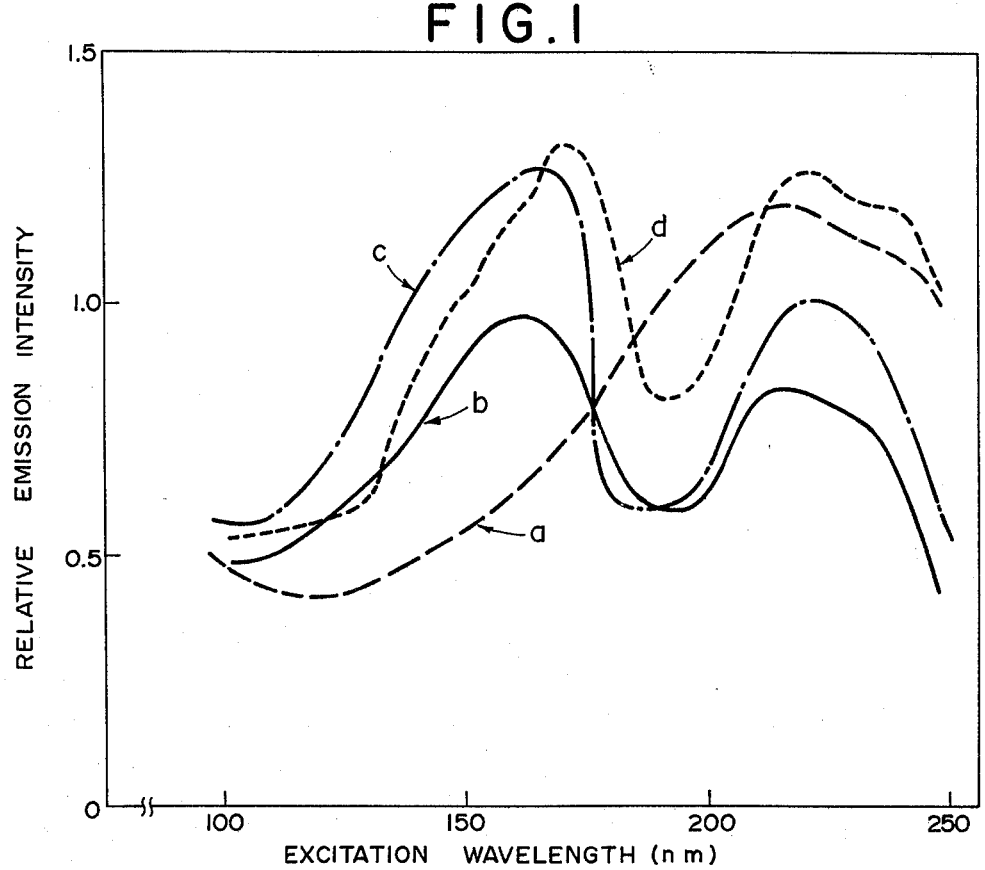
FIG. 1 shows the relationship between the relative emission intensity and the excitation wavelength of the phosphor employed in the present invention in comparison with that of a conventional phosphor.

The excitation spectra of the conventionally known phosphor, i.e. europium activated yttrium oxide phosphor, and the phosphor employed in the present invention, i.e. europium activated yttrium gadolinium borate phosphor are shown in FIG. 1. In the spectra shown in FIG. 1, curve-$a$ represents the conventional phosphor $(Y_{0.97}, Eu_{0.03})_2O_3$, and curve-$b$, curve-$c$ and curve-$d$ represent the phosphors employed in the present invention which are represented by the formulae $\{[Y_{0.4}, B_{0.6}]_{0.97}Eu_{0.03}\}_2O_3$, $\{[(Y_{0.67}, Gd_{0.33})_{0.4}B_{0.6}]_{0.97}Eu_{0.03}\}_2O_3$, and $\{[Gd_{0.4}, B_{0.6}]_{0.97}Eu_{0.03}\}_2O_3$ respectively. The excitation spectra were obtained by use of a vacuum spectroscope. The relative emission intensity represented along the ordinate of the graph shown in FIG. 1 indicates the ratio of the emission intensity of the aforesaid phosphors to that of sodium salicylate powder.

As shown in FIG. 1, the emission intensity of the europium activated yttrium gadolinium borate phosphor employed in the present invention represented by curves-$b$, $c$ and $d$ is higher than that of the conventionally known europium activated yttrium oxide phosphor represented by curve-$a$ in the region of short wavelengths below 200nm, particularly in the region of about 125 to 180nm.

In view of the spectra of ultraviolet rays shown in Table I and the emission intensity of the phosphors shown in FIG. 1, the combination of the europium activated yttrium gadolinium borate phosphor and the radiation obtained by glow discharge in a single gas such as hydrogen, nitrogen, argon, krypton or xenon is preferred to effect an emission of high intensity. Further, although a single gas may be used for obtaining light emission in a gaseous discharge light emitting element, a mixture of gases is more desirable in practical use in order to improve the discharge firing potential, maintaining potential, stability of the discharge and efficiency of radiation of ultraviolet rays. Therefore, in the practical gaseous discharge element, a mixture of more than one gas is sealed in an air-tight transparent container. Several examples of mixtures of gases which are suitable for the aforesaid phosphor employed in this invention are shown in Table II. The examples shown in Table II are all of mixtures consisting of two gases. It will be readily understood that mixtures of more than two gases can be used for causing a gaseous discharge which emits ultraviolet rays having a wavelength of shorter than 200nm.

TABLE II

| Basic gas | Mixture of gas |
|---|---|
| Argon | Helium + Argon |
| Krypton | Helium + Krypton, Neon + Krypton |
| | Argon + Krypton, Helium + Argon + Krypton |
| Xenon | Helium + Xenon, Neon + Xenon |
| | Argon + Xenon, Helium + Argon + Xenon |
| Hydrogen | Argon + Hydrogen, Helium + Hydrogen |
| | Neon + Hydrogen |
| Nitrogen | Helium + Nitrogen, Argon + Nitrogen |

The radiation efficiency effected when each of several mixtures of gases is used together with each of several phosphors including the phosphor employed in the present invention and the conventional phosphor is shown in Table III below. In Table III, Phosphor (1) is a conventionally known phosphor, i.e. europium activated yttrium oxide represented by the formula $(Y_{0.97}, Eu_{0.03})_2O_3$, and Phosphors (2), (3) and (4) are the phosphors employed in the present invention, i.e. europium activated yttrium gadolinium borate phosphor represented by the formulae $\{[Y_{0.4}, B_{0.6}]_{0.97}Eu_{0.03}\}_2O_3$, $\{[(Y_{0.67}, Gd_{0.33})_{0.4}B_{0.6}]_{0.97} Eu_{0.03}\}_2O_3$ and $\{[Gd_{0.4} B_{0.6}]_{0.97} Eu_{0.03}\}_2O_3$, respectively.

TABLE III

| Mixture of gases | He-Xe (Xe:2%) | Ne-Xe (Xe-10%) | Ar-Xe (Xe:10%) | He-Kr (Kr:2%) |
|---|---|---|---|---|
| Pressure (Torr) | 150 | 80 | 20 | 150 |
| Phosphor (1) | 1.0 | 1.0 | 1.0 | 1.0 |
| Phosphor (2) | 1.4 | 1.5 | 1.5 | 1.1 |
| Phosphor (3) | 1.6 | 1.7 | 1.8 | 1.1 |
| Phosphor (4) | 1.4 | 1.5 | 1.6 | 1.1 |

The results shown in Table III were obtained by use of an embodiment of the gaseous discharge light emitting element in accordance with the present invention partly shown in FIG. 2. The light emitting element as shown in FIG. 2 is an image display panel comprising a number of cells 20. The image display panel including the cells 20 is composed of a front glass plate 21, a rear glass plate 22 arranged in parallel to said front glass plate 21 with a space formed therebetween, and an intermediate layer 23 disposed on the rear glass plate 22 with a number of parallel strip-like cathodes 24 interposed between the intermediate layer 23 and the rear glass plate 22. The cathode 24 has a through-hole 24a and the rear glass plate 22 has a number of parallel grooves 22a behind the through-hole 24a of the cathodes 24. The intermediate layer 23 is provided with a number of tapered holes 23a above said through-holes 24a of the cathodes 24. On the wall of the tapered holes 23a are applied coating layers 25 of a red emission phosphor as said phosphors (1), (2), (3) and (4). A number of parallel anodes 26 made of wires are provided on the inner surface of the front glass plate 21 at the positions above said tapered hole 23a of the intermediate layer 23. A number of auxiliary anodes 27 are provided on the bottom of said grooves 22a of the rear glass plate 22 at the positions below said anodes 26 on the front glass plate 21. An air gap 28 is formed between the inner surface of the front glass plate 21 and the surface of the intermediate layer 23. The discharge gap between the cathodes 24 and the anodes 26 is selected to be in the range of 0.1 to 3.0mm. A gas mixture as shown in Table II is sealed in the space in the grooves 22a, the tapered holes 23a and the air gap 28. The pressure within the space is selected to be such that the pd product is in the range of 30 to 300 Torr.mm and a DC potential is applied across the cathode 24 and the anode 26 to create a glow discharge therebetween. Ultraviolet rays are generated by glow discharge and the phosphor applied to the tapered hole 23a as the coating layer 25 is excited to emit red light. In the experiment giving the results shown in Table III, the gas mixtures as shown in Table III were sealed in the cells 20 and the radiation efficiency thereof was measured. The radiation efficiency was measured by first measuring the radiation intensity of the light emitted from the phosphor coating layer 25 by use of a photomultiplier located close to the front glass plate 21 and then dividing the power of radiation calculated in accordance with spectral response characteristics by the input electric power.

The results shown in Table III make it clear that the combinations of the phosphor (2), (3) or (4) and the gas mixture of He-Xe, Ne-Xe, Ar-Xe or He-Kr are desirable to obtain light emission of high radiation efficiency. Further, it has been proved that various gases or gas mixtures which have been mentioned hereinbefore are effective in producing light emission of high intensity in combination with the phosphors (2) to (4).

Table IV below shows the radiation efficiency of various gas mixtures in the gaseous discharge light emitting elements in accordance with the present invention as shown in FIGS. 2 and 6 to 8.

TABLE IV

| Mixture of gases | He-Xe (Xe: 2%) | He-Xe (Xe: 2%) | Ar-Xe (Xe: 10%) | He-Kr (Kr: 6%) | Ne-Xe (Xe: 10%) |
|---|---|---|---|---|---|
| Discharge gap d (mm) | 1.5 | 0.25 | 1.5 | 2.0 | 1.5 |
| Pd product (Torr mm) | 225 | 50 | 30 | 200 | 120 |
| Phosphor (1) | 1.0 | 1.0 | 1.0 | 1.0 | 1.0 |
| Phosphor (2) | 1.4 | 1.5 | 1.5 | 1.1 | 1.5 |
| Phosphor (3) | 1.6 | 1.7 | 1.8 | 1.2 | 1.7 |
| Phosphor (4) | 1.4 | 1.6 | 1.6 | 1.1 | 1.5 |

The results shown in Table IV were obtained in the same manner as that employed to obtain the results shown in Table III. The composition of the gas mixture, the discharge gap and the pd product were changed in the measurements. Table IV indicates that the radiation efficiency of the gaseous discharge light emitting elements in accordance with the present invention having the discharge gap of 0.25 to 2.0mm and the pd product of 30 to 225 Torr.mm wherein the Phosphors (2) to (4) are employed are markedly enhanced.

Although Table IV shows only five different compositions of mixtures of gases as indicated, single gases or mixtures of gases as shown in Tables I and II are also useful for the considerable enhancement of the radiation efficiency. Further, it should be noted that the gaseous discharge light emitting elements which have the discharge gap of 0.1 to 3.0mm and the pd product of 30 to 300 Torr.mm can be used as the light emitting elements in accordance with the present invention to enhance the radiation efficiency and should be regarded as variations or embodiments of the present invention included within the scope of the spirit of the present invention.

Figure 3:
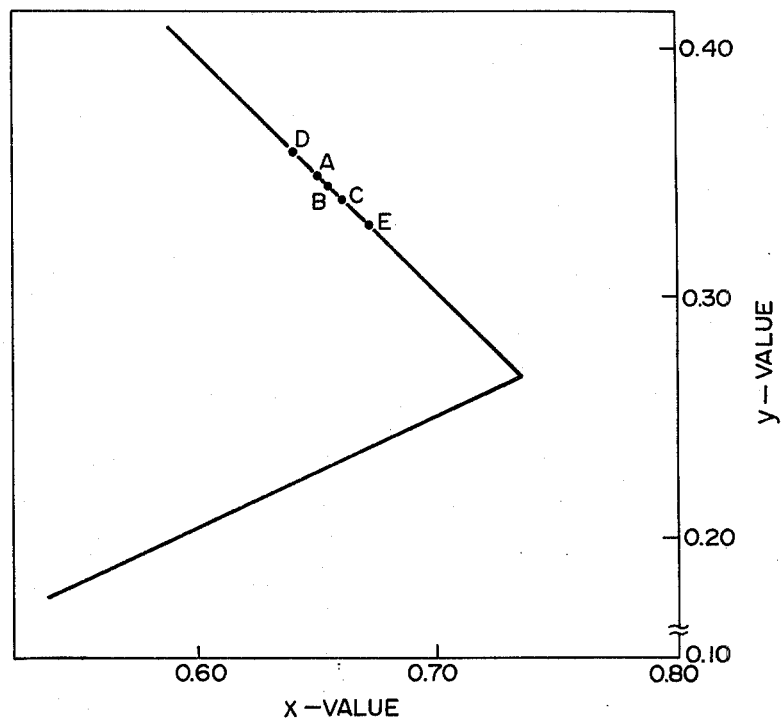
FIG. 3 is a chromaticity diagram showing the chromaticity of the phosphor employed in the present invention and two conventional phosphors.

The color of the light emitted from the phosphor coating layer 25 of the cell 20 made of the phosphor (2), (3) or (4) is the same and as pure as that of the light emitted from the conventional phosphor such as said phosphor (1). The chromaticity of the color of light emitted by various phosphors including both the conventional phosphor and the phosphor of the present invention are indicated in the chromaticity diagram shown in FIG. 3. The diagram shown in FIG. 3 is part of the CIE chromaticity diagram in which chromaticity A, B and C are indicative of the color of light emitted from said phosphors (2), (3) and (4) of the present invention and D and E are indicative of the color of light emitted from said phosphor (1) and a conventionally known europium activated yttrium vanadate phosphor represented by the formula $(Y_{0.97}, Eu_{0.03})VO_4$, respectively. As shown in FIG. 3, the color of the light emitted from the phosphors (2), (3) and (4) of the present invention is substantialy the same as that of the light emitted from the conventionally known phosphors as mentioned hereinabove. The europium activated yttrium vanadate represented by the formula $(Y_{0.97}, Eu_{0.03})VO_4$ will hereinbelow referred to as phosphor (5).

The emission intensity of the phosphors employed in the present invention is not lowered through the process of applying the phosphor to the wall of the cell in the image display panel or the like whereas that of the phosphor (1) is markedly lowered through the applying process. In the process of applying the phosphor to the wall of the cell or the like, the phosphor is soaked in an ammonium bichromate aqueous solution. The change or deterioration of the emission intensity of the phosphors are shown in Table V, in which the emission intensity of the phosphors (1) to (5) after the phosphors have been soaked in the ammonium bichromate aqueous solution is indicated. In more detail, 3 gram of each phosphor was soaked in 30ml of 0.7% ammonium bichromate aqueous solution for five days and then washed and dried. The value indicated in Table V as the emission intensity is a relative value with respect to the emission intensity thereof measured before the phosphor was soaked in the solution, the latter emission intensity being represented by the value 100. As shown in Table V, the luminous intensity of the phosphor (1) is markedly lowered by the chemical reaction thereof with the bichromate ions. However, the phosphors (2) to (4) employed in the present invention and the phosphor (5) are comparatively stable against the bichromate ions.

TABLE V

| Phosphor | Relative emission intensity (%) |
| --- | --- |
| (2) | 89 |
| (3) | 91 |
| (4) | 91 |
| (1) | 33 |
| (5) | 89 |

Now the desirable ratio of incorporation of the phosphor components employed in the present invention will be describe in detail hereinbelow. The phosphor to be employed in the present invention is represented by the formula $$\{[(Y_{1-x}Gd_x)_{1-z}B_z]_{1-y}Eu_y\}_2O_3 \ldots \quad (F)$$

The value $z$ will be described with reference to FIG. 4, and the value $x$ will be described with reference to FIG. 5.

Figure 4:
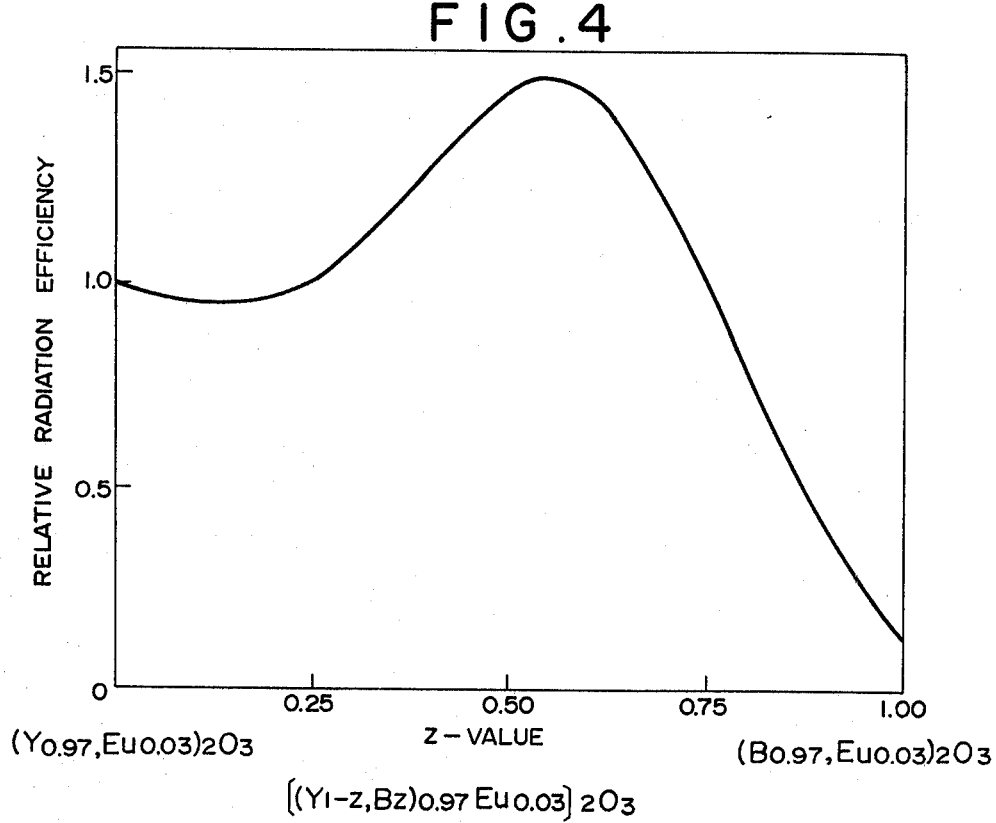
FIG. 4 is a graph showing the relationship between the relative radiation efficiency of the light emitting element of this invention and the amount of boron (value-$z$) in the phosphor employed therein.

FIG. 4 is a graphical representation showing the relation between the radiation efficiency and the value $z$ of the phosphor represented by the formula $[(Y_{1-z}B_z)_{0.97}Eu_{0.03}]_2O_3$, that is the phosphor represented by the formula (F) wherein the value $x$ is zero and the value $y$ is 0.03. In the graph the abscissa indicates the value $z$ and the ordinate indicates the radiation efficiency of the phosphor in a relative value with respect to the radiation efficiency of the phosphor (1) which is represented by value 1.0. As shown in FIG. 4, the radiation efficiency does not fall below 1.0 where $0.25 \leq z \leq 0.75$ and is particularly high in the region of $0.50 \leq z \leq 0.65$. Further, it has also been proved that a similar result is obtained when the value $x$ is 0.33 or 1.

Figure 5:
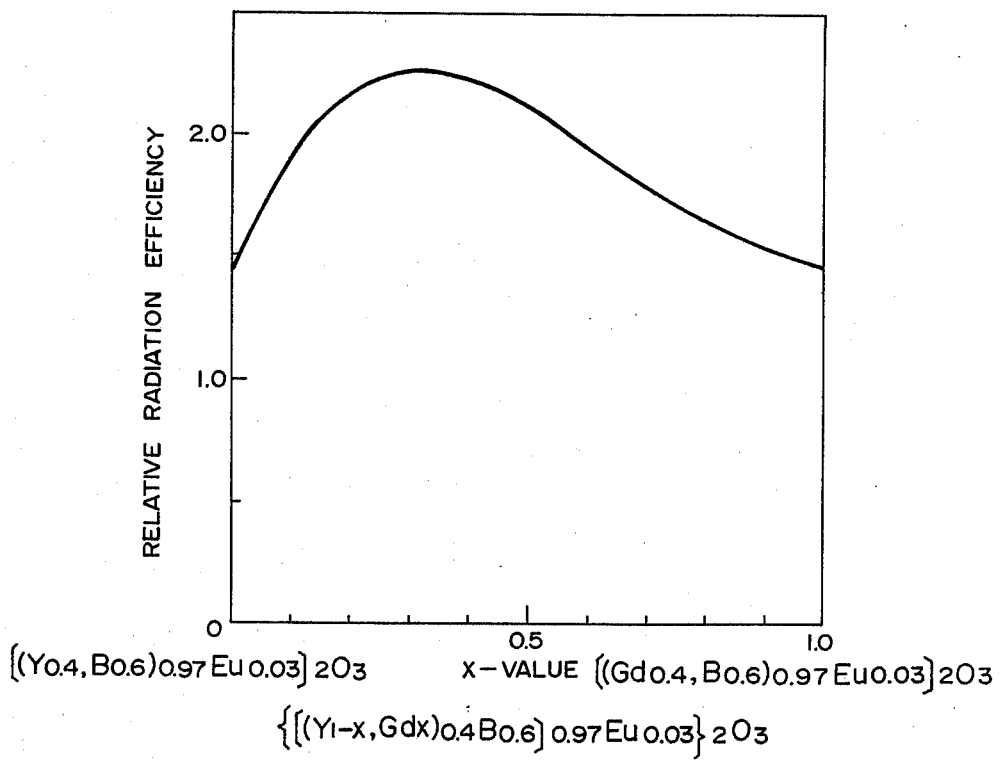
FIG. 5 is a graph showing the relationship between the relative radiation efficiency of the light emitting element of this invention and the amount of gadolinium (value-$x$) in the phosphor employed therein.

FIG. 5 is a graphical representation showing the relation between the radiation efficiency and the value $x$ of the phosphor represented by the formula 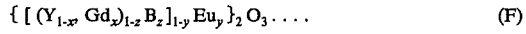$\{[(Y_{1-x},Gd_x)_{0.4}B_{0.6}]_{0.97}Eu_{0.03}\}_2O_3$, that is the phosphor represented by the formula (F) wherein the value $z$ is 0.6 and the value $y$ is 0.03. In the graph, the abscissa indicates the value $x$ and the ordinate indicates the radiation efficiency of the phosphor in a relative value with respect to the radiation efficiency of the phosphor (1) which is represented by the value 1.0. As shown in FIG. 5, the radiation efficiency does not fall below 1.0 whatever value $x$ may take and is particularly high in the region of $0.10 \leq x \leq 0.60$.

The value $y$, that is the amount of europium for activation, should be in the region of $0.001 \leq y \leq 0.1$. When the value $y$ is beyond this region, the radiation efficiency falls below that of the conventional light emitting element employing the phosphor (1). In view of radiation efficiency, the particularly preferable value of $y$ is within the region of $0.005 \leq y \leq 0.05$.

Summarizing the above described results, the preferable ranges of the values $x$, $y$ and $z$ are $0 \leq x \leq 1$, $0.001 \leq y \leq 0.1$ and $0.25 \leq z \leq 0.75$, and the particularly desirable ranges thereof are $0.10 \leq x \leq 0.60$, $0.005 \leq y \leq 0.05$ and $0.50 \leq z \leq 0.65$.

The combination of the phosphor represented by the formula (F) wherein the values $x$, $y$, and $z$ are defined as mentioned above and the gas or gas mixture which has discharge radiation spectra in the region of short wavelength of below 200nm may be used in various conventionally known structures of light emitting elements. Several examples of the light emitting elements in which said combination of the phosphor and gas or gas mixture will be described hereinbelow with reference to FIGS. 6 to 8. FIG. 6 shows a small lamp of diode type, and FIGS. 7 and 8 show image display panels composed a number of gaseous discharge cells arranged in a matrix.

Referring to FIG. 6, a phosphor layer 61 is applied to the internal surface of a tube 62 and a pair of electrodes 63 are provided in the tube 62 to make a gaseous discharge therebetween and cause the phosphor layer 61 to be excited by radiations emitted by the discharge. Thus, by applying a potential across the pair of electrodes 63, the phosphor layer 61 is excited to emit light.

FIG. 7 shows the structure of an image display panel developed by Owens Illinois Corporation. Dielectric layers 71 are applied on a pair of oppositely disposed glass plates 72 and 73 on the inner surfaces thereof. Between the dielectric layers 71 and the glass plates 72 and 73, electrode strips 74 and 75 extending in directions perpendicular to each other are provided. On one dielectric layer 71, phosphor layers 76 are disposed so as to be excited by ultraviolet rays produced by a gaseous discharge created between the electrode strips 74 and 75 through the dielectric layers 71. The phosphor layers 76 are disposed around the positions where the upper electrode strips 74 and the lower electrode strips 75 cross with each other.

FIG. 8 shows the structure of an image display panel developed by Burroughs Corporation, which is very similar to the embodiment shown in FIG. 2. The elements designated by reference numerals 81 to 87 are all equivalent to those shown in FIG. 2 designated by 21 to 27, respectively, and accordingly the detailed description thereof is omitted here since the function thereof will be obvious to those skilled in the art.

In the light emitting elements as shown in FIGS. 6 to 8, gases or gas mixtures as given in Table II or III can be employed to improve the radiation efficiency insofar as the discharge gap is in the range of 0.1 to 3.0mm and the pd product is in the range of 30 to 300 Torr.mm.

We claim:

1. A gaseous discharge light emitting element comprising an air-tight transparent container, a pair of discharge electrodes provided in said container, the discharge gap between said electrodes being in the range of 0.1 to 3.0mm, a gas or gas mixture having discharge radiation spectra within the region of wavelength shorter than 200nm sealed in said container, the pressure of said gas or gas mixture being such that the product of the pressure and said discharge gap is in the range of 30 to 300 Torr.mm, and a phosphor disposed in said container, said phosphor being a europium activated yttrium gadolinium borate phosphor represented by the formula $$\{[(Y_{1-x}Gd_x)_{1-z}B_z]_{1-y}Eu_y\}_2O_3$$

where $0 \leq x \leq 1$, $0.001 \leq y \leq 0.1$ and $0.25 \leq z \leq 0.75$.

2. A gaseous discharge light emitting element as defined in claim 1 wherein said $x$ is within the range of $0.10 \leq x \leq 0.60$.

3. A gaseous discharge light emitting element as defined in claim 1 wherein said $y$ is within the range of $0.005 \leq y \leq 0.05$.

4. A gaseous discharge light emitting element as defined in claim 1 wherein said $z$ is within the range of $0.50 \leq z \leq 0.65$.

5. A gaseous discharge light emitting element as defined in claim 1 wherein said container is a tube and said phosphor is applied to the inner surface of the tube.

6. A gaseous discharge light emitting element as defined in claim 1 wherein said container is provided therein with a plurality of pairs of electrodes arranged in a matrix, whereby an image is displayed by the combination of the electrode pairs excited.

7. A gaseous discharge light emitting element as defined in claim 6 wherein a cell defined by a wall coated with said phosphor is disposed between each said pair of electrodes.

8. A gaseous discharge light emitting element as defined in claim 1 wherein said gaseous mixture contains a gas selected from the group consisting of hydrogen, nitrogen, argon, krypton and xenon or mixtures thereof.

* * * * *

UNITED STATES PATENT OFFICE
CERTIFICATE OF CORRECTION

Patent No. 4,085,350          Dated April 18, 1978

Inventor(s) Akiyasu Kagami et al.

It is certified that error appears in the above-identified patent and that said Letters Patent are hereby corrected as shown below:

On the cover sheet (Item 73) Asignee should read

-- Dai Nippon Toryo Co. Ltd. Osaka, Japan and Japan Broadcasting Corporation, Tokyo, Japan --.

Signed and Sealed this

Third Day of October 1978

[SEAL]

Attest:

RUTH C. MASON
*Attesting Officer*

DONALD W. BANNER
*Commissioner of Patents and Trademarks*